United States Patent
Focke

[11] Patent Number: 6,150,946
[45] Date of Patent: Nov. 21, 2000

[54] MONITORING UNIT WITH TEST BEAM IN CONJUNCTION WITH PACKAGING MACHINES

[75] Inventor: Heinz Focke, Verden, Germany

[73] Assignee: Focke & Co. (GmbH & Co.), Verden, Germany

[21] Appl. No.: 08/947,272

[22] Filed: Oct. 8, 1997

[30] Foreign Application Priority Data

Oct. 11, 1996 [DE] Germany ............... 196 41 988

[51] Int. Cl.⁷ .................................. G08B 23/00
[52] U.S. Cl. ............ 340/675; 250/559.01; 356/429; 356/431
[58] Field of Search ............ 340/675; 356/429, 356/431; 250/559.01, 559.03

[56] References Cited

U.S. PATENT DOCUMENTS

| | | | |
|---|---|---|---|
| 3,091,114 | 5/1963 | Webster | 73/49.3 |
| 4,627,319 | 12/1986 | Mattei et al. | 83/73 |
| 4,644,152 | 2/1987 | Gurioli | 250/223 |
| 5,138,178 | 8/1992 | Wong et al. | 250/559 |
| 5,260,583 | 11/1993 | Rye | 250/572 |
| 5,714,763 | 2/1998 | Chase et al. | 250/559.3 |
| 5,798,531 | 8/1998 | Harris | 250/559.03 |

FOREIGN PATENT DOCUMENTS

| | | |
|---|---|---|
| 014680 | 7/1985 | European Pat. Off. |
| 0146800A1 | 7/1985 | European Pat. Off. |
| OS2205366 | 8/1972 | Germany |
| 3008309C2 | 9/1981 | Germany |
| 3502009A1 | 9/1985 | Germany |
| 3008309 | 8/1986 | Germany |
| 3812689 | 11/1989 | Germany |
| 3812689A1 | 11/1989 | Germany |
| 3916566A1 | 11/1989 | Germany |
| 4100239 | 7/1992 | Germany |
| 4100239A1 | 7/1992 | Germany |
| 4200971A1 | 7/1993 | Germany |
| 4302777A1 | 8/1994 | Germany |
| 9421170 U1 | 7/1995 | Germany |
| 29601159 U1 | 5/1996 | Germany |
| 07115212A | 5/1995 | Japan |

OTHER PUBLICATIONS

European Search Report dated Apr. 12, 2000.

*Primary Examiner*—Julie Lieu
*Attorney, Agent, or Firm*—Abelman, Frayne & Schwab

[57] ABSTRACT

Monitoring unit with one light beam for monitoring the postion of and/or forming material webs or blanks. Monitoring units of this type usually consist of a transmitter, for example, a LED and a receiver, for example, a photocell. The operation of the machine entails the light emitting and receiving units being covered by dust and other contamination. In order to avoid this, a flow of gas or air is directed onto the translucent housing surrounding the same. The air is supplied via an air line in which an electrical cable to supply power to the monitoring unit is also accomodated.

15 Claims, 2 Drawing Sheets

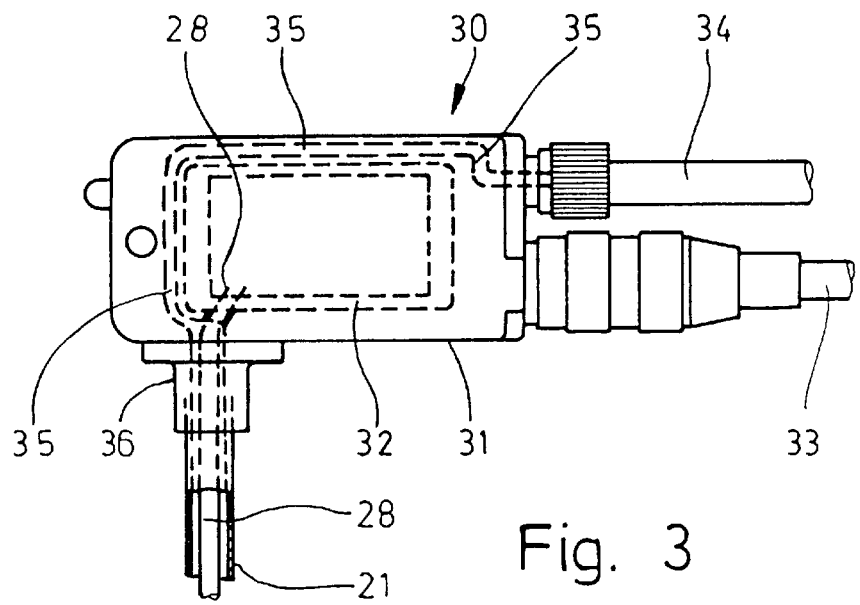
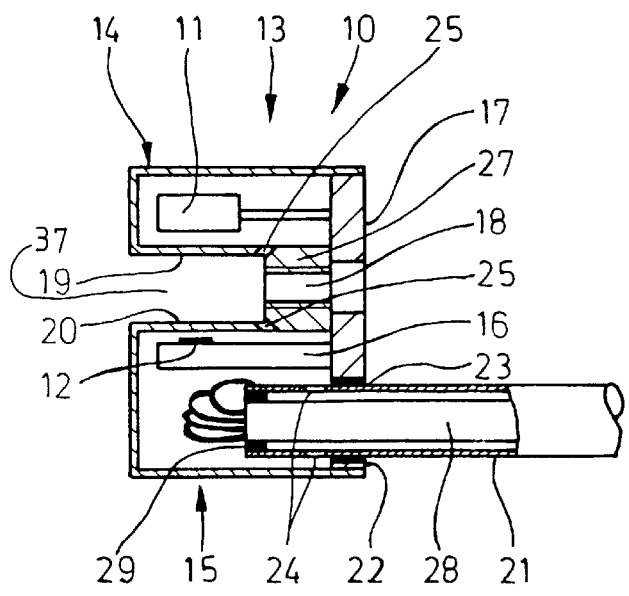
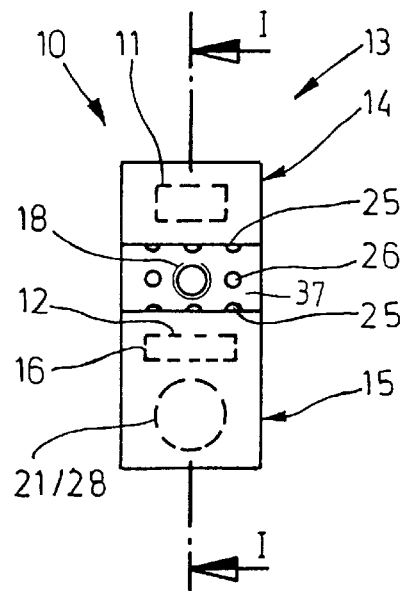

MONITORING UNIT WITH TEST BEAM IN CONJUNCTION WITH PACKAGING MACHINES

FIELD OF THE INVENTION

The invention relates to a monitoring unit with emitted and received test beam, particularly an optoelectronic monitoring unit with test beam for material webs and/or blanks made of packaging material in conjunction with packaging machines, the monitoring unit having at least one (optical) transmitter and a receiver, preferably lying opposite same.

BACKGROUND OF THE INVENTION

In packaging technology, monitoring units with a test beam, particularly a photoelectric barrier, are required in many areas. These monitoring units have on the one hand the purpose of controlling the working procedures of the (packaging) machine, for example by means of print marks on material webs or blanks. On the other hand, however, precise positioning and/or formation of material webs also requires to be monitored.

The operation of the (packaging) machine is dependent on the correct functioning of the monitoring units. There in turn are sensitive to contamination, particularly to the dust and particle deposits which are unavoidable in packaging machines.

The object underlying the invention is to improve monitoring units of the type described in that they have an increased degree of operational reliability.

SUMMARY OF THE INVENTION

In achieving this object, the monitoring unit according to the invention is characterized in that, in the region of the transmitter and/or receiver a flow of gas or air is generated preferably constantly and in a direction leading away from the transmitter and/or receiver.

Thus according to the invention permanent operational reliability of the monitoring units is guaranteed in that their individual components are kept free of dust and other such deposits. For this purpose a gas or air flow is generated which causes a current leading away from the units, so that deposition of dust and other particles is not possible.

According to a further aspect of the invention, the parts of the monitoring unit, particularly transmitter and/or receiver, can be disposed in a housing or in partial housings which have, for outlet of the test beam, an aperture or a wall permeable to the test beam, or a window. In a monitoring unit designed in this way, the gas or air flow is directed according to the invention such that the wall permeable to the test beam or the window of the housing is kept free of deposits. Thus in particular air at high pressure can be introduced into the housing, and can emerge from the housing through aligned, positioned outlet bores in the region of the permeable wall.

A further aspect of the invention resides in the handling of a light-conducting unit, namely a fiber-optic cable. This latter is, according to the invention, disposed in a tube, hose or housing, which ensures an annular intermediate space relative to the fiber-optic cable. A gas or air flow is directed through this in the direction of the end face of the fiber-optic cable. The fiber-optic cable is fitted at the end with a head, and if necessary with an optical deflector. The end of the fiber-optic cable is supported with this head in a housing. The air flow emerges via the free side out of the tube, hose or housing, i.e. in the direction away from the end of the fiber-optic cable.

Further details of the invention relate to the formation of monitoring units or parts thereof, particularly for use in packaging technology.

BRIEF DESCRIPTION OF THE DRAWINGS

Embodiments in particular of optoelectronic monitoring units, given by way of example, will be described in more detail in the following with reference to the drawings, which show:

FIG. 1 shows a monitoring unit in cross-section or vertical section in the cutting plane I—I of FIG. 2, FIG. 2 shows the monitoring unit according to FIG. 1 in left side view, FIG. 3 shows an amplifier unit in front elevation.

DESCRIPTION OF THE PREFERRED EMBODIMENTS

Figure 4:
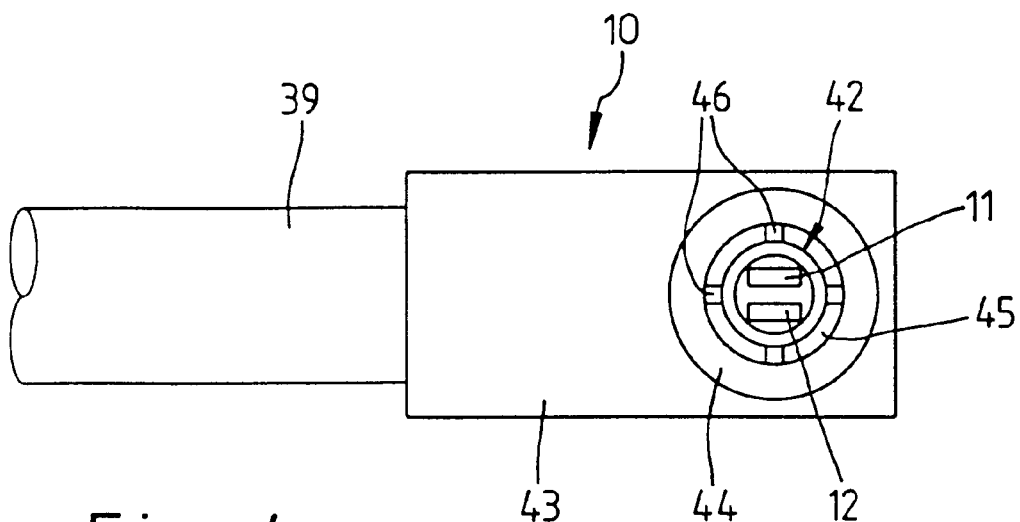
FIG. 4 shows an end region of a fiber-optic system in side elevation and, FIG. 5 shows the detail according to FIG. 4 in a horizontal section.

In FIGS. 1 to 3, a bifurcate photoelectric barrier is shown as an embodiment, given by way of example, of an optoelectronic monitoring unit 10. This barrier is used predominantly in packaging technology, for example to check and control the position of material webs of packaging material etc.

The monitoring unit 10 is equipped with a transmitter 11 and a receiver 12. A light-emitting diode preferably serves as transmitter 11. A photocell serves as a receiver 12. From the transmitter 11 a light beam is directed on to the receiver 12. The object to be monitored, for example the material web, is led through between transmitter 11 and receiver 12.

Transmitter 11 and receiver 12 are accommodated in a housing 13. The housing has overall a U-shaped design. In one leg of the housing 13, namely in a partial housing subassembly 14, there is located the transmitter 11. In another partial housing 15, arranged at a distance, the receiver 12 is accommodated. The latter sits on a board 16 with electrical components. The partial housings 14, 15 are attached to a supporting plate 17. This plate also serves to fasten the transmitter 11 and the receiver 12, the latter via the board 16. A bore hole 18 provided between the partial housings 14, 15 serves to fasten the monitoring unit on to a support of the (packaging) machine.

The partial housings 14, 15 consist of translucent or transparent material, especially plastic. Alternatively, the housing 13 can be so designed that at least the walls of the housing facing one another consist of translucent material, in order to let a light beam through from the transmitter 11 to the receiver 12.

In order to avoid contamination of the monitoring unit 10 by dust, particles of material etc., a flow of gas, especially a flow of air, is directed constantly or in cycles at targeted regions of the monitoring unit 10. The air flow is led in such a way that the region between transmitter 11 and receiver 12 is kept free and any particles etc. are blown away. The air stream is accordingly directed in such a way that a flow of air is directed in the direction away from the optoelectronic units. In the present case, the region between the partial housings 14, 15, i.e. a control space 37, is kept free. The air stream is directed such that an air flow is directed towards the free sides of this control space 37.

The air flow or the air keeping the units free of dirt is led on the embodiment shown here, via an air line 21 which can be designed as a hose, into the housing 13 of the monitoring unit 10. On the present embodiment, the cleansing air enters the partial housing subassembly 15 allocated to the receiver 12. The air line 21 enters via an aperture 23 provided with sealing 22 via the supporting plate 17 into the partial housing 15. The cleansing air penetrates partial housing 15 via side outlet bore holes 24, directed radially. Partial housing 15 is connected in side regions (not shown) with partial housing subassembly 14, such that cleansing air from partial housing 15, i.e. air under pressure, also penetrates partial housing 14.

The housing 13, or the partial housings 14, 15, are provided with air holes 25, 26 through which the cleansing air flows out of the housing 13 or the partial housings 14 and 15, purposefully into the region between the walls 19, 20 facing one another, i.e. into the control space, and out of same again. This air under pressure keeps the surfaces of the walls 19, 20 free of dirt. The air holes 25, 26 act like air jets because of their size.

The air holes 25, 26 are positioned to correspond with their purpose in cleaning. A number of air holes 25, namely three each, are located in the region of a groove, or corner in wall 19 or 20, on the one hand, and a transverse connecting wall 27 between walls 19 and 20. These air holes 25 are directed obliquely and thus on to the respectively facing wall 19, 20. Additional air holes 26 are located in the region of the connecting wall 27, on both sides of bore hole 18. In this way, a constant flow of air out of the inner space of the monitoring unit, i.e. out of control space 37, is achieved.

Electrical lines lead to the monitoring unit 10. These lines are combined in the embodiment shown here, into one cable 28. Air line 21 and cable 28 form one unit. In the present case, the cable 28 is arranged inside the air line 21. The air line 21 is of such dimensions that a free annular cross-section for carrying the air remains in relation to the cable 28. The cable 28 leaves the air line 21 at the free end, in the housing 13 or partial housing 15. The cable 28 is sealed in this end region from the air line 21 by a seal 29.

A further special feature consists in the fact that an amplifier 30 is associated with the monitoring unit 10. This amplifier unit is positioned on the machine at a distance from the monitoring unit. The distance can be, for example, 50 cm.

The amplifier 30 consists of an amplifier housing 31. Inside same, an electric control unit 32 is arranged. The cable 28 leads from the monitoring unit 10 to this control unit.

The control unit 32 is involved in the present case in the supply of the monitoring unit 10 with (cleansing) air. An electrical line 33 and a separate air line 34 lead to the control unit 32. The air line is connected to a compressed air source (not shown) which supplies the system with (oil-free) compressed air.

Inside the amplifier 30, there is formed an air channel 35 which leads outside the region of the control unit 32 from the mouth of the air line 34 to a common connector 36. The latter is formed on a transverse side wall opposite the entry side of the air line 34 and electrical line 33. The air channel 35 leads into the connector 36 designed as a connection piece. The air line 21 connects to the end of the air channel. The cable 28 leads from the control unit 32 coming into the connector 36 and thus into the end of air line 21. The latter is anchored in the connector 36. The air channel 35 is formed inside the amplifier housing 31 in an encapsulant made of plastic or the like.

Figure 5:
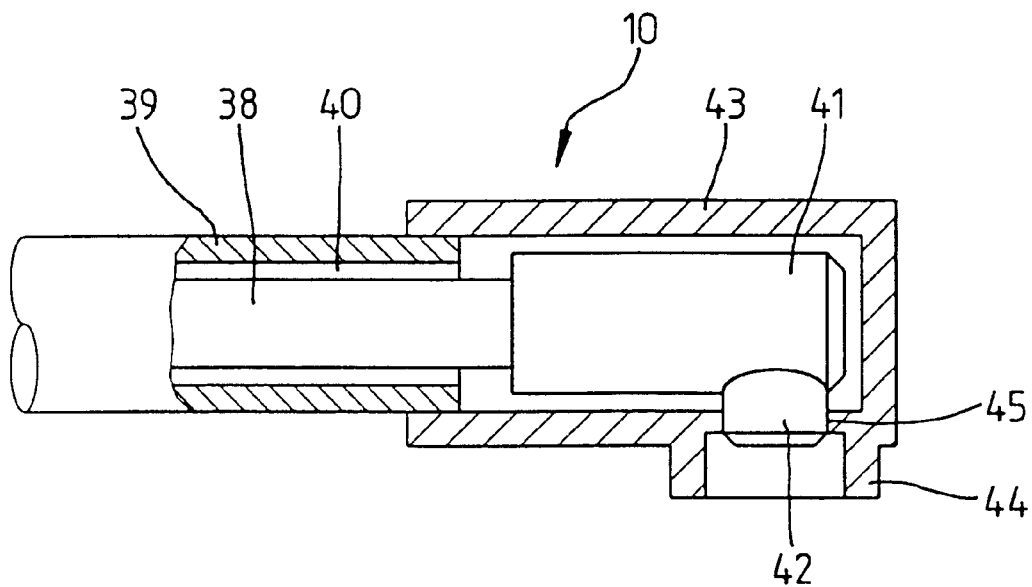

Another important example of the invention of this application is shown in FIGS. 4 and 5. A light conductor 38, made for example of glass fibers, is guided in an outer tube 39. Alternatively, this can be a hose. The internal diameter of this outer tube 39 is appreciably larger than the external dimension of the light conductor 38. In this way there results an annular channel 40, in which there is generated a gas or air flow, i.e. directed toward the (free) end of the light conductor 38.

In the embodiment shown, the light conductor terminates in a head 41 which preferably consists of metal. This forms an optical outlet for the light conductor 38, which is in the present embodiment a laterally-mounted optical deflector 42. This is open to the exterior, so that light can emerge from the head 41.

The head 41 is disposed in a cylindrical housing 43 that is connected to the free end of the outer tube 39 and has internal dimensions larger than the dimensions of the head 41, so that a space is formed for the passage of the gas or air flow. An outwardly-open outlet nozzle 44 is attached laterally to the housing.

The light conductor 38 or head 41 is mounted in the region of an outlet aperture in the housing 43. In the present case the optical deflector system 42 is located in a lateral aperture 45 facing the outlet nozzle 44. As FIG. 4 shows, the optical deflector 42 is mounted centrally via support ribs 46 in the outlet nozzle 44 or in the aperture 45. The pressurized air current leading away from the end of the light conductor 38 passes through the aperture 45, i.e. through free segments in the region between the optical deflector 42, the outlet nozzle 44 and the support ribs 46.

As FIG. 4 shows, in the present case the light conductor 38 is so constructed that it has transmitter 11 and receiver 12 lying next to one another.

LIST OF REFERENCE NUMBERS 10 monitoring unit
11 transmitter
12 receiver
13 housing
14 partial housing
15 partial housing
16 board
17 supporting plate
18 bore hole
19 wall
20 wall
21 air line
22 seal
23 aperture
24 outlet bore hole
25 air hole
26 air hole
27 connecting wall
28 cable
29 seal
30 amplifier
31 amplifier housing
32 control unit
33 electrical line
34 air line
35 air channel
36 connector
37 control space
38 light conductor
39 outer tube
40 annular channel
41 head 42 optical deflector
43 housing
44 outlet nozzle
45 aperture
46 support rib

We claim:

1. An optoelectronic monitoring unit employing an emitted and received test beam of light for detecting material webs and/or blanks of packaging material in conjunction with packaging machines, the monitoring unit (10) comprising:
   a) a U-shaped monitor housing (13) formed by opposing subassembly arms (14,15) and a connecting wall (27) extending between and joined to the subassemblies;
   b) at least one transmitter (11) operatively positioned in one of the subassemblies and a receiver (12) operatively positioned in the other subassembly,
   c) the facing walls (19, 20) of the subassemblies comprising a light-transmitting material through which the test beam passes,
   d) an air line (21) communicating with the interior of the monitor housing (13) for supplying compressed air to the interior of the housing,
   e) a plurality of air discharge holes (25) extending through the monitor housing walls proximate the junction of the connecting wall (27) and the adjacent subassembly,
   f) the air discharge holes (25) being positioned to direct a jet of compressed air from the interior of the housing (13) onto the exterior surfaces of the light-transmitting wall faces, whereby the exterior surfaces of the light-transmitting wall faces are kept free of dust by the directed jets of compressed air.

2. The monitoring unit of claim 1 where the air discharge holes (25) located proximate the junction of the connecting wall (27) with one subassembly are positioned to direct a jet of compressed air onto the exterior surface of the light-transmitting material face of the other subassembly.

3. The monitoring unit of claim 1 where the air discharge holes located in the connecting wall proximate the junction with one subassembly are positioned to direct a jet of compressed air from the interior of the monitor housing onto the light transmitting material face of the adjacent subassembly.

4. The monitoring unit of claim 1 which further comprises a plurality of air discharge holes (26) extending across the connecting wall (27) between the subassembly arms (14, 15) and communicating with the interior of the monitor housing.

5. The monitoring unit of claim 1 where the compressed air is directed onto the exterior surface of the light transmitting material intermittently.

6. Monitoring unit according to claim 1, characterized in that the air line (21) and the cable (28) running inside same are connected to the amplifier (30) via a connector (36).

7. Monitoring unit according to claim 1, characterized in that a light conductor (38) is proximate the transmitter (11) and receiver (12), said light conductor (38) being, a glass-fiber cable disposed in an outer tube (39) such that an annular channel results between light conductor (38) and outer tube (39), and that a gas or air flow may be passed through between light conductor (38) and outer tube (39), in the direction of one free end of the light conductor (38).

8. Monitoring unit according to claim 7, characterized in that there is disposed at the end of the light conductor (38) a head (41) with an aperture, particularly with an optical deflector (42) aligned sideways, and in that the head (41) is positioned in a housing (43) with an aperture (45) for entry and emergence of the light beam, the light conductor (38) or the optical deflector (42) being supported in the aperture (45) such that apertures are formed, leading outwards out of the housing (43), for the air flow.

9. Monitoring unit according to claim 1, characterized in that the air under pressure is supplied through the common air line (21) to the monitoring unit (10), and an electric cable (28), leads to the monitoring unit (10) forming a unit with the air line (27) arranged inside the air line (21) such that the latter forms an air channel with annular cross-section.

10. Monitoring unit according to claim 9, characterized in that the air line (21) ends with a free end in the housing and the cable (28) in the housing (13) emerges from the air line (21), the cable (28) inside the air line (21) is sealed at the free end by seals (29) and the air line (21) has outlet bore holes (27) directed sideways inside the housing (13, 15) for the air.

11. Monitoring unit according to claim 1, characterized in that the amplifier (30) is associated with the monitoring unit (10) and positioned remotely from same, the air line (21) being connected to the amplifier (30) or an amplifier housing (31) and connected to a compressed air source via an amplifier-air line (34) connected to the amplifier housing (31).

12. Monitoring unit according to claim 11, characterized in that an air channel (35) is formed inside the amplifier housing (31) from amplifier-air line (34) to air line (21).

13. Monitoring unit according to claim 12, characterized in that the light transmitting material through which the test beam passes is transparent.

14. Monitoring unit according to claim 12, characterized in that the light transmitting material through which the test beam passes is translucent.

15. Monitoring unit according to claim 12, characterized in that the air line (21) and the cable (28) running inside same are connected to the amplifier (30) via a connector (36).

* * * * *